US009166941B2

(12) United States Patent
Glickstein et al.

(10) Patent No.: US 9,166,941 B2
(45) Date of Patent: Oct. 20, 2015

(54) SYNCHRONIZING EMAIL MESSAGES BETWEEN EXTERNAL AND LOCAL EMAIL SERVERS AND/OR A WIRELESS DEVICE

(75) Inventors: Robert S. Glickstein, San Rafael, CA (US); Michael Alyn Miller, Redlands, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 549 days.

(21) Appl. No.: 11/789,516

(22) Filed: Apr. 24, 2007

(65) Prior Publication Data

US 2008/0270547 A1    Oct. 30, 2008

(51) Int. Cl.
*G06F 15/16* (2006.01)
*H04L 12/58* (2006.01)
*H04L 29/08* (2006.01)

(52) U.S. Cl.
CPC ............... *H04L 51/22* (2013.01); *H04L 51/26* (2013.01); *H04L 67/1095* (2013.01); *H04L 67/2842* (2013.01); *H04L 67/325* (2013.01); *H04L 51/24* (2013.01); *H04L 51/38* (2013.01)

(58) Field of Classification Search
None
See application file for complete search history.

(56) References Cited

U.S. PATENT DOCUMENTS

| 5,961,590 | A  | * | 10/1999 | Mendez et al. ............... 709/206 |
| 7,624,146 | B1 | * | 11/2009 | Brogne et al. ................ 709/206 |
| 2002/0040369 | A1 |   | 4/2002 | Multer et al. |
| 2003/0135565 | A1 | * | 7/2003 | Estrada ......................... 709/206 |
| 2003/0191782 | A1 | * | 10/2003 | Buxton et al. ................ 707/202 |
| 2004/0024910 | A1 | * | 2/2004 | Marl et al. .................... 709/248 |
| 2004/0151114 | A1 | * | 8/2004 | Ruutu ............................. 370/230 |
| 2005/0038864 | A1 | * | 2/2005 | Wang et al. ................... 709/213 |
| 2005/0147130 | A1 |   | 7/2005 | Hurwitz et al. |
| 2007/0006214 | A1 | * | 1/2007 | Dubal et al. .................. 717/171 |
| 2007/0006241 | A1 |   | 1/2007 | Wang et al. |
| 2007/0088791 | A1 | * | 4/2007 | Clarke ......................... 709/206 |

FOREIGN PATENT DOCUMENTS

| CN | 1859332 | 11/2006 |
| EP | 1014629 | 6/2000 |
| EP | 1557987 | 7/2005 |
| EP | 2149091 | 2/2010 |
| JP | 2010525740 | 7/2010 |
| KR | 20100015641 | 2/2010 |
| WO | WO-02099651 | 12/2002 |

(Continued)

OTHER PUBLICATIONS

PCT Search Report mailed Jul. 18, 2008, 2 Pages.

(Continued)

*Primary Examiner* — Karen Tang
(74) *Attorney, Agent, or Firm* — Sunah Lee; Kate Drakos; Micky Minhas

(57) ABSTRACT

Synchronizing email messages between an external email server, a local email server and a wireless data processing device. For example, one embodiment of a system comprises a task queue comprised of a plurality of task entries, each entry associated with a particular user email account on the external email server and/or the local email server and representing a task to be performed in relation to the user email account; and a synchronizer to read synchronization tasks from the task queue and cause the synchronization tasks to be executed to synchronize email data stored on the external email server, the local email server and the wireless data processing device.

20 Claims, 15 Drawing Sheets

(56) References Cited

FOREIGN PATENT DOCUMENTS

| WO | WO-2004077770 | 9/2004 |
| WO | WO-2005046148 | 5/2005 |
| WO | WO-2008133820 | 11/2008 |

OTHER PUBLICATIONS

Written Opinion mailed Jul. 18, 2008, 5 Pages.
"Foreign Office Action", Chinese Application No. 200880013197.5, (Jan. 31, 2012), 7 pages.
"Foreign Office Action", Chinese Application No. 200880013197.5, (Apr. 20, 2011), 12 pages.
"Foreign Office Action", Chinese Application No. 200880013197.5, (Oct. 29, 2012), 7 pages.
"Foreign Office Action", Chinese Application No. 200880013197.5, (May 23, 2012), 14 pages.
"Foreign Office Action", Japanese Application No. 2010-506210, (Oct. 1, 2012), 6 pages.
"European Search Report", Application No. EP08742930.4, (May 10, 2013), 7 pages.
"Extended European Search Report", EP Application No. 08742931.2, Dec. 12, 2013, 7 pages.
"Foreign Office Action", EP Application No. 08742931.2, Feb. 24, 2015, 4 pages.
"Foreign Office Action", EP Application No. 08742931.2, Apr. 22, 2015, 5 pages.

* cited by examiner

Internal to External Message ID Mapping

| Internal Server (IMAP) Message ID Codes | External Server (POP) Message ID Codes |
|---|---|
| Folder=inbox, uid = 3361 | B88143177 6693cca7e41ccded0f56610 (msg no 1) |
| Folder=inbox, uid = 3362 | B88143177 6693cca7e41ccded0f56611 (msg no 2) |
| Folder=inbox, uid = 3363 | B88143177 6693cca7e41ccded0f56612 (msg no 3) |
| Folder=saved mail, uid = 3361 | B88143177 6693cca7e41ccded0f56613 (msg no 4) |
| Folder=saved mail, uid = 3362 | B88143177 6693cca7e41ccded0f56614 (msg no 5) |
| Folder=inbox, uid = 3364 | B88143177 6693cca7e41ccded0f56615 (msg no 6) |
| Folder=inbox, uid = 3365 | B88143177 6693cca7e41ccded0f56616 (msg no 7) |

*Fig. 3*

GID to Standard IMAP ID Code Mapping

| GID Codes | Standard IMAP ID Codes |
|---|---|
| 0000000001 | Folder=inbox, uid = 3361 |
| 0000000002 | Folder=inbox, uid = 3362 |
| 0000000003 | Folder=inbox, uid = 3363 |
| 0000000004 | Folder=saved mail, uid = 3361 |
| 0000000005 | Folder=saved mail, uid = 3362 |
| 0000000006 | Folder=inbox, uid = 3364 |
| 0000000007 | Folder=inbox, uid = 3365 |

*Fig. 5*

| User ID Code | Device ID Code | User Name | Online Status | SIM IDs | Lease Expiry | Insufficient Funds |
|---|---|---|---|---|---|---|
| 660098353 | 885985283 | Scott Kister | Offline | 1231234 1232389 | 5:21:05 | 1 |
| 609382528 | 8895528536 | Christopher Desalvo | Online Dispatcher 615 | 3359815 | 4:21:05 | 1 |
| 682529853 | 8892253825 | Pablo Calamera | Offline | 2231212 | 23:21:05 | 1 |
| ---------- | ---------- | ---------- | ---------- | ---------- | ---------- | ---------- |

SYNCHRONIZING EMAIL MESSAGES BETWEEN EXTERNAL AND LOCAL EMAIL SERVERS AND/OR A WIRELESS DEVICE

TECHNICAL FIELD

This application relates generally to the field of data processing systems. More particularly, this application relates to an improved architecture for caching email messages within a wireless data service.

BACKGROUND

E-mail has become an irreplaceable communication tool in the World today. In the business world, virtually all employees rely on e-mail to communicate externally with customers and internally with other employees. In addition, most e-mail users have at least one personal e-mail account. The personal e-mail account may be provided by the user's Internet Service Provider (e.g., PACIFIC BELL, AT&T WORLDNET,™ AMERICA ONLINE,™ ... etc.), or by an Internet Web site (e.g., YAHOO™ Mail or HOTMAIL™).

One problem which exists is that users may find it difficult to coordinate among a plurality of different e-mail accounts. For example, while a user may check his/her corporate e-mail account throughout the day while at work, the user may not remember to, or may not be able to, check his/her personal e-mail account. Similarly, while at home in the evening or on weekends, the user may only have access to his/her personal e-mail account. Thus, if the user sends an e-mail from his/her personal account to a business associate, the user may not be able to review the business associate's reply until the user returns home and logs in to his/her personal e-mail account. Conversely, if the user sends an e-mail from his/her corporate account to a friend, the user may not be able to access the friend's reply until the user returns to work and logs in to his/her personal e-mail account. Even if a user is able to access both e-mail accounts from the same location, requiring the user to log into two or more different e-mail systems is somewhat burdensome, particularly when two or more different user agents may be required on the user's desktop computer and/or wireless client (e.g., MICROSOFT OUTLOOK™ and LOTUS NOTES™).

The foregoing problem is further exacerbated by the fact that many e-mail systems work with different, incompatible e-mail standards. The two most common e-mail standards are the Post Office Protocol 3 ("POP3") and the Internet Messaging Access Protocol ("IMAP").

POP3 is commonly used for Internet e-mail accounts. A POP3 server temporarily stores incoming e-mail messages until they are downloaded by a logged in user. The user may configure the server to either delete the e-mail messages as soon as they are downloaded or wait until the user indicates that they should be deleted. POP3 is a relatively simple protocol with limited configurable options. All pending messages and attachments are downloaded from a single e-mail folder on the server to a single e-mail folder on the user's client computer or wireless device (i.e., the user agent's "Inbox"). Messages are identified based on a unique message identification code.

IMAP is another common, and somewhat more sophisticated, e-mail standard which is widely used for both Internet e-mail accounts and corporate e-mail accounts. IMAP4 is the latest version. Unlike POP3, it provides a message database in which messages can be archived in folders (e.g., inbox, sent mail, saved mail, ... etc) and e-mailboxes that can be shared between users. IMAP also provides improved integration with Multipurpose Internet Mail Extensions ("MIME"), the protocol used to attach files to e-mail messages (e.g., users can read only message headers without having to automatically accept and wait for the attached files to download).

SUMMARY

Synchronizing email messages between an external email server, a local email server and a wireless data processing device. For example, one embodiment of a system comprises a task queue comprised of a plurality of task entries, each entry associated with a particular user email account on the external email server and/or the local email server and representing a task to be performed in relation to the user email account; and a synchronizer to read synchronization tasks from the task queue and cause the synchronization tasks to be executed to synchronize email data stored on the external email server, the local email server and the wireless data processing device.

BRIEF DESCRIPTION OF THE DRAWINGS

A better understanding of synchronizing email messages between external and local email servers, and/or a wireless device can be obtained from the following detailed description in conjunction with the following drawings, in which:

FIG. 3 illustrates a mapping of internal account codes with external account codes according to one embodiment of the invention.

FIG. 5 illustrates a mapping of global identification codes ("GIDs") to standard IMAP identification codes according to one embodiment of the invention.

FIG. 7 illustrates a set of user data maintained within a user database according to one embodiment of the invention.

DETAILED DESCRIPTION OF PREFERRED EMBODIMENTS

Throughout the description, for the purposes of explanation, numerous specific details are set forth in order to provide a thorough understanding, yet it will be apparent to one skilled in the art that synchronizing email messages between external and local email servers, and/or a wireless device may be practiced without some of these specific details. In other instances, well-known structures and devices are shown in block diagram form to avoid obscuring any underlying principles.

To address the problems described above, the assignee of the present application developed a system for coordinating among a plurality of email accounts. Certain aspects of the system are described in U.S. Pat. No. 7,155,725, entitled APPARATUS AND METHOD FOR COORDINATING MULTIPLE EMAIL ACCOUNTS; and U.S. Pat. No. 7,162,513, entitled APPARATUS AND METHOD FOR DISTRIBUTING ELECTRONIC MESSAGES TO A WIRELESS DATA PROCESSING DEVICE USING A MULTI-TIERED QUEUING ARCHITECTURE (the "Prior Patents"). These patents are assigned to the assignee of the present application and are incorporated herein by reference.

The system described in the Prior Patents will now be described with respect to FIGS. 1-9, followed by a description of new refinements to the email system which allow for more efficient coordination, synchronization, and management of email from internal and external email accounts. Although the embodiments of the invention described below will again focus on an implementation using a wireless client device, the underlying principles of the invention are not necessarily limited to a wireless implementation.

Embodiments Described in the Prior Patents

Figure 1:
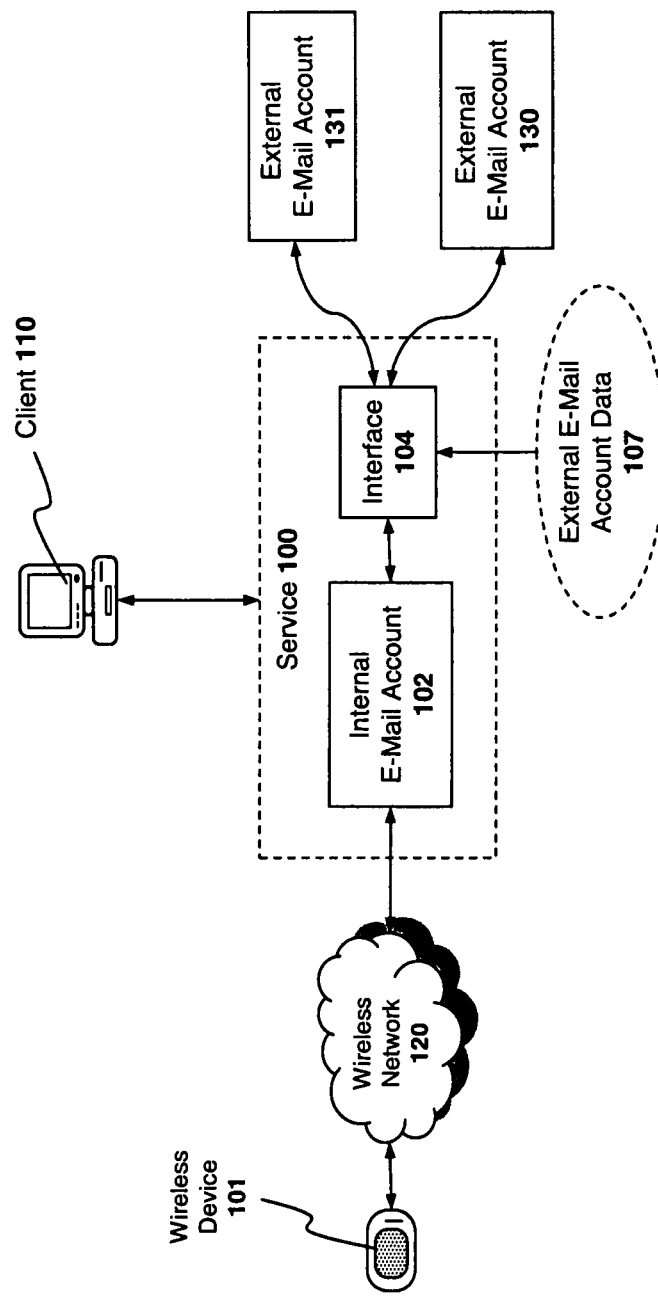
FIG. 1 illustrates an e-mail system architecture according to one embodiment of the invention.

Embodiments of the invention may be implemented on a data processing service 100 such as that illustrated generally in FIG. 1. In one embodiment, the service 100 acts as a proxy between a wireless data processing device 101 and any external servers with which the wireless device 101 communicates such as, for example, e-mail servers 130 and 131 and Web servers (not shown). For example, standard applications, multimedia content and data may be converted by the service 100 into a format which the wireless device 101 can properly interpret. One embodiment of a service 100 is described in U.S. Pat. No. 6,721,804, entitled PORTAL SYSTEM FOR CONVERTING REQUESTED DATA INTO A BYTECODE FORMAT BASED ON PORTAL DEVICE'S GRAPHICAL CAPABILITIES which is assigned to the assignee of the present application and which is incorporated herein by reference.

According to the embodiment illustrated in FIG. 1, a user is provided with an internal e-mail account 102 on the service 100 (e.g., maintained on one or more e-mail servers). As used herein, "internal" refers to the fact that the e-mail account is maintained and controlled by the service 100. The user may access the internal e-mail account 102 to send and receive e-mail messages from the user's wireless device 101 over a wireless network 120 and/or from a client computer 110 (e.g., a personal computer communicatively coupled to the Internet). Various network types may be employed including, for example, those that support Cellular Digital Packet Data ("CDPD") and General Packet Radio Service ("GPRS"). It should be noted, however, that the underlying principles of the invention are not limited to any particular type of wireless network 120.

In addition to the internal e-mail account 102, the user may have various "external" e-mail accounts 130 and 131, i.e., "external" in the sense that they are not maintained or controlled directly by the service 100. As described above, in prior systems, the user would typically be required to log in separately to each of the individual e-mail accounts 102, 130 and 131. By contrast, in one embodiment of the invention, the service 100 automatically retrieves messages from the user's external accounts 130 and 131 and store the messages within the user's internal e-mail account 102. Thus, the user may access all of his/her messages from a single account 102 and using a single user agent.

In the embodiment illustrated in FIG. 1, an interface 104 configured on the service 100 periodically queries the external e-mail accounts 130 and 131 to check for new messages. Alternatively, or in addition, the interface 104 may retrieve messages from the external accounts 130 and 131 only after receiving a command from the user, or each time the user logs in to the internal e-mail account 102. In one embodiment, the user may configure the external e-mail accounts 130, 131 to automatically transmit new e-mail messages to the interface 104 as they are received.

Before the interface 104 can retrieve messages from the external e-mail accounts 130, 131, it must initially be programmed with the network addresses of the servers for each account (e.g., mail.pacbell.net) and valid user authentication data. For example, the external e-mail accounts 130, 131 will typically require a valid user name and password before providing e-mail messages to the interface 104. Accordingly, as indicated in FIG. 1, the user may initially be required to provide the interface with external e-mail account data 107.

Once e-mail messages from the external e-mail accounts 130, 131 have been stored within the internal e-mail account 102, the user may perform various e-mail operations on them (e.g., reply to, delete, move to saved mail folder, . . . etc) just as if they were initially addressed to the internal account 102. In addition, in one embodiment, the interface 104 will transmit mail account updates to the external e-mail accounts 130, 131. For example, when a user deletes a particular message, an indication that the message was deleted will be transmitted to the external accounts 130, 131, thereby maintaining message consistency among the various e-mail accounts. In one embodiment, the choice as to whether operations on internal accounts 102 should be reflected on external accounts 130, 131, may be made by the user on an account-by-account basis.

Figure 2:
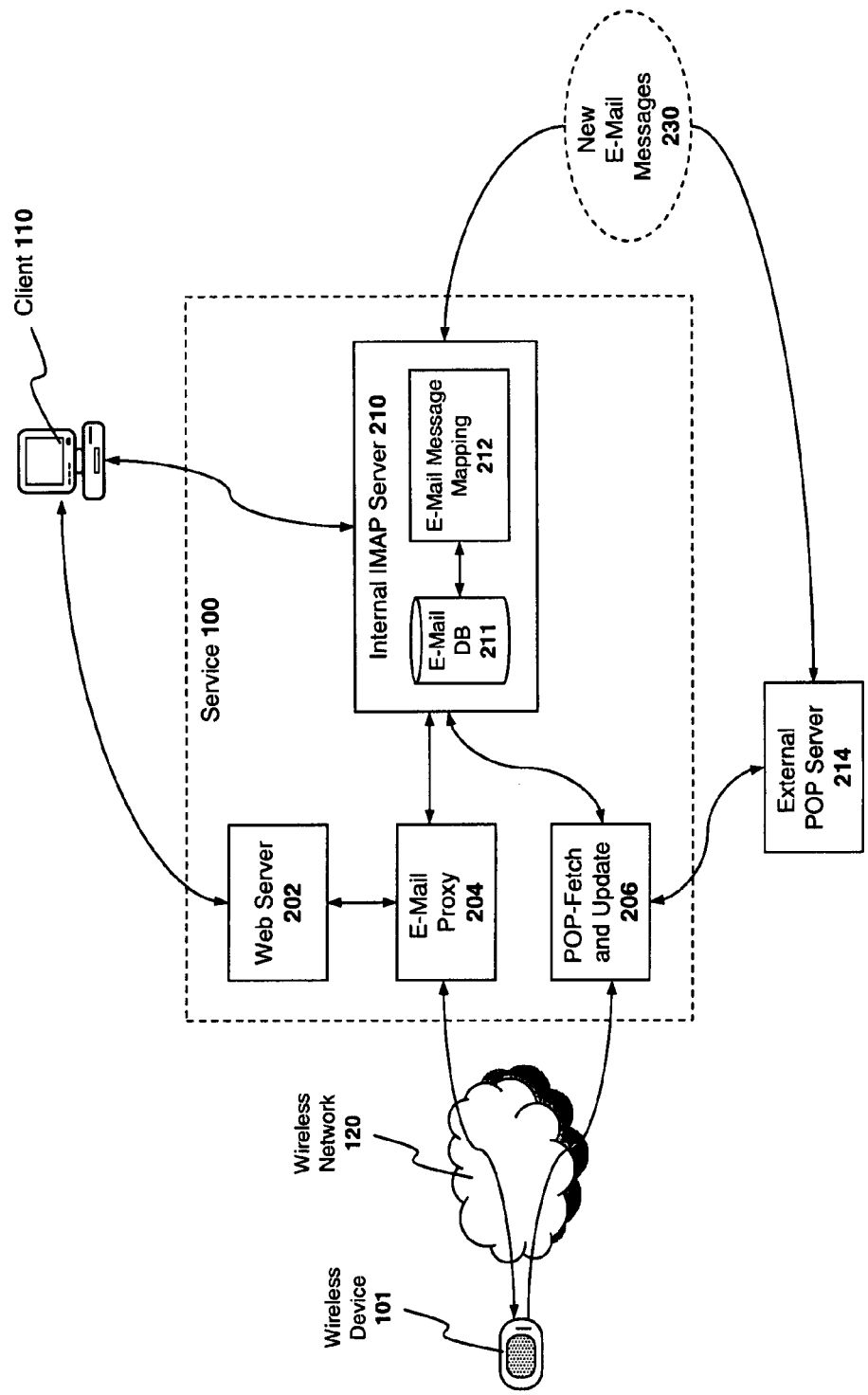
FIG. 2 illustrates a more specific embodiment of the invention which includes an internal IMAP account and an external POP account.

One particular embodiment for coordinating e-mail messages between an internal e-mail account which employs the IMAP protocol (e.g., IMAP4) and an external account which employs the POP3 protocol is illustrated in FIG. 2. Although this embodiment will be described with reference to these two particular protocols, it should be noted that the underlying principles of the invention may be implemented using a variety of alternate messaging protocols (e.g., the Distributed Mail System Protocol ("DMSP"), X.400, . . . etc).

In this embodiment, a POP Fetch/Update interface 206 is configured on the service 100 to fetch e-mail messages from one or more external POP servers 214. As described above, the POP Fetch/Update interface 206 may be programmed to periodically (e.g., every 15 minutes) check for new e-mail messages 230 on the external POP account 214. In addition, the user may command the POP Fetch/Update interface 206 to check for new messages at any given time, from either the wireless device 101 or the client computer 110.

Regardless of how the POP Fetch/Update interface 206 is triggered to check for new messages, once it is, it will initially transmit authentication data to the external POP account 214 such as, for example, the user's e-mail account name and password. Once the authentication data is accepted by the external POP account 214, the POP account 214 transmits any new e-mail messages to the POP Fetch/Update interface 206. In one embodiment, the POP protocol is used to transmit files from the POP account 214 to the POP Fetch/Update interface 206. However, the underlying principles of the invention are not limited to any message transmission protocol.

Depending on how the user's external POP account is configured, the messages transmitted to the POP Fetch/Update interface 206 may either be automatically deleted from the external account 214 as soon as they are transmitted, or maintained on the external account 214 until the user subsequently indicates that the messages should be deleted.

In one embodiment, the POP Fetch/Update interface 206 transfers the new email messages to a specified folder on the internal IMAP account 210. For example, if the user has a YAHOO email account and a WORLDNET email account, the user may set up two independent folders on the internal IMAP account 210 (e.g., "YAHOO Mail" and "WORLDNET Mail," respectively) to store new email messages from both accounts (as mentioned above, IMAP provides support for email message folders).

If the external POP account 214 is configured to store e-mail messages even after the messages have been retrieved, then two copies of each message will exist following retrieval: one copy on the external account 214 and one copy on the internal e-mail database 211. As such, to provide for greater coordination between the two accounts, in one embodiment, e-mail message mapping logic 212 generates a link between the messages stored on the internal account 210 and the external account 214. For example, a table such as the one illustrated in FIG. 3 may be generated by the e-mail message mapping logic 212 to map internal e-mail message identification codes 301 with external e-mail message identification codes 302. In operation, each time the user performs an operation with respect to a particular internal e-mail message, the e-mail message mapping logic 212 will determine whether a corresponding external e-mail message exists. If so, it will notify the POP Fetch/Update interface 206, which will subsequently update the external POP account 214 accordingly.

For example, referring again to FIG. 3, if the user deletes a message with internal message ID code "folder=saved mail, uid=3361," the e-mail message mapping logic 212 will indicate to the POP Fetch/Update interface 206 that external message number 4, with external message ID code "B881431776693cca7e41ccded 0f56613" should be deleted from the external POP server 214. The POP Fetch/Update interface 206 will then transmit a POP3 "delete" command to the external POP account 214, identifying the message using the message number (e.g., "DELE 4"). In this way, the user can effectively manage several different mail accounts from a single account.

The user may access the internal e-mail account 210 from his/her wireless device 101 which, in one embodiment, connects to the account via an e-mail proxy 204. As described in the Network Portal Application, in one embodiment, the e-mail proxy 204 uniquely formats e-mail messages and other content (e.g., Web pages, graphical images, etc) based on the capabilities of the particular wireless device 101. The user may also access the internal e-mail account 210 via a client desktop or notebook computer 110, either directly or through a Web interface 202 (e.g., such as the Web interfaces provided by Yahoo Mail and Hotmail).

Figure 4:
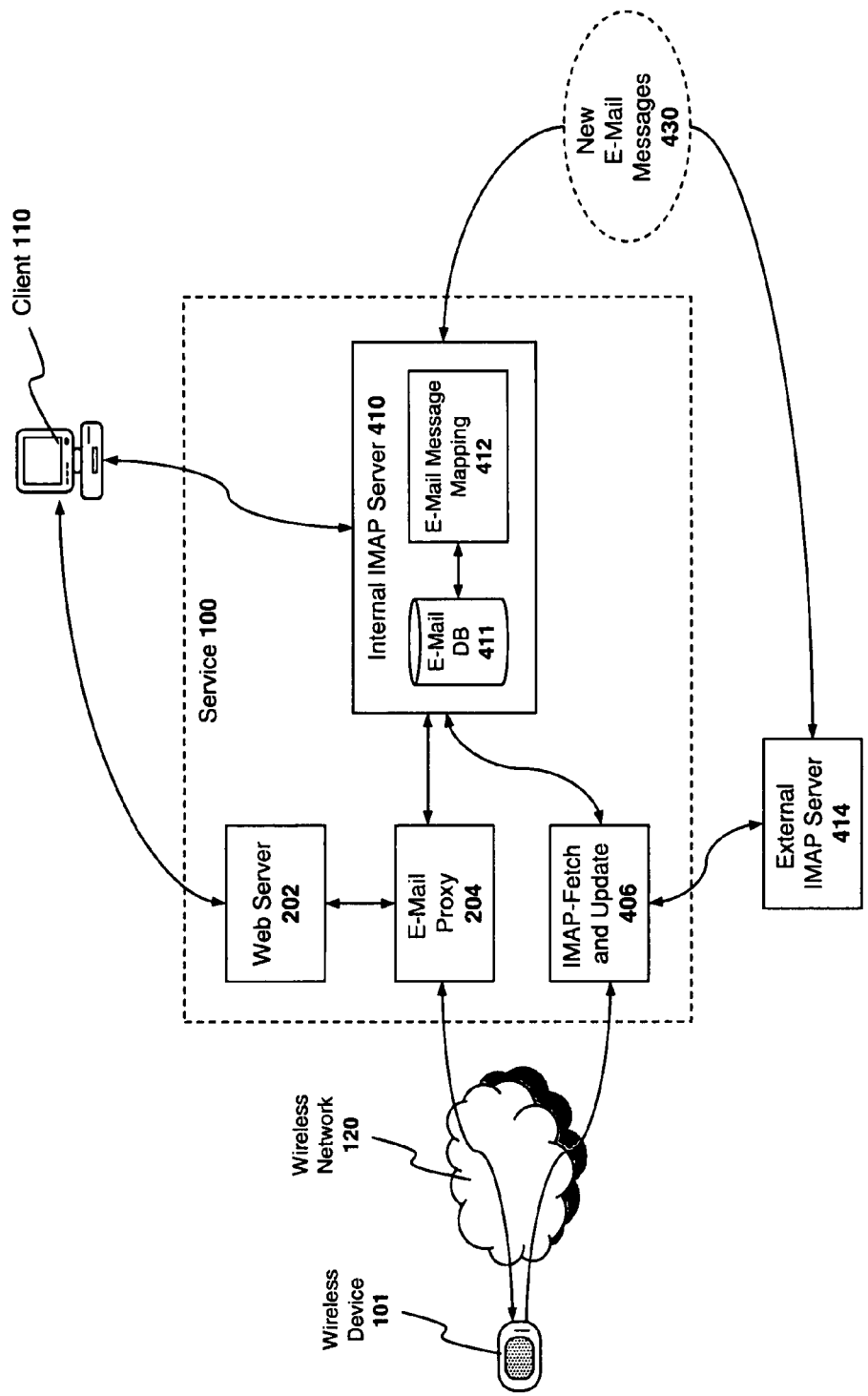
FIG. 4 illustrates one embodiment of an e-mail system in which both the internal and external account are IMAP accounts.

FIG. 4 illustrates an embodiment in which both the internal e-mail account 410 and the external e-mail account 414 are IMAP accounts. Because the external IMAP account 414 will have support for e-mail folders, various levels of e-mail coordination are possible. For example, the user may configure the IMAP Fetch/Update Interface 406 to retrieve messages only found in specified folders on the external e-mail account 414 (e.g., just from the "inbox" folder). Once specific folders have been identified by the user, the internal account 410 may retrieve messages from the external account 414 in a similar manner as described above. For example, once the messages are retrieved from the external account 414, e-mail message mapping logic 412 executed within the internal account 410 will associate each external message ID code with an internal message ID code (e.g., as illustrated generally in FIG. 3). The association may then be used to transmit message updates to the remote account 414. For example, when the user deletes a message, the e-mail message mapping logic 412 will determine if a corresponding external message exists (e.g., by performing a table lookup using the internal message ID code). If so, the e-mail message mapping logic 412 will transmit the external ID code to the IMAP Fetch/Update Interface 406 which will subsequently transmit a "delete" command to the external IMAP account 414 (i.e., identifying the message to be deleted by the external ID code).

One additional problem when working with internal and/or external IMAP accounts is that e-mail message ID codes are only unique within each individual IMAP folder. For example, both the "inbox" folder and the "saved mail" folder may contain e-mail messages with ID codes ranging from 1 through 20 (i.e., the same ID codes are used for different e-mail messages). In addition, when an e-mail message is moved from a source folder to a destination folder, it is provided with a new ID code (i.e., based on the ID codes used for messages already stored in the folder). As a result, some mechanism must be provided in order to maintain an accurate mapping between messages stored on the internal e-mail account 210, 410 and the external e-mail account 214, 414.

In one embodiment of the invention, in order to accurately track messages across IMAP folders, a unique global ID code ("GID") is generated for all messages on the IMAP account 210, 410. Unlike standard IMAP identification codes, a message's GID uniquely identifies that message on the account 210, 410, and will not change as the message is moved from one folder to the next. The table in FIG. 5 sets forth an exemplary mapping of GIDs to standard IMAP ID codes. In one embodiment, the e-mail message mapping logic 212, 412 associates each e-mail message's GID with a corresponding ID code on the remote account. As a result, when a user moves a file from one folder to another at the internal account 210, 410, the corresponding message on the external account 214, 414 may still be identified.

GIDs may be generated and maintained in several different ways. In one embodiment, whenever an update to a particular message is made, the GID mapping is updated. For example if GID=20 corresponds to INBOX:25 and the user moves INBOX:25 to Trash:12, the mapping is updated accordingly. One advantage of this technique is that it enables quick lookups of messages by GIDs.

In another embodiment, an X-Header such as X-GID:20 is inserted into the actual header of the mail message. If the message is moved, the header moves with it. One advantage of this technique is that less work is required to track the message from one folder to the next.

In one embodiment, when a user responds to an e-mail message from the internal account 210, 410, the "FROM:" field in the header will indicate the original account to which the message was transmitted. For example, if the message was originally sent to the external account 214, 414, then the "FROM:" field will include the external account address, notwithstanding the fact that the reply is generated at the internal account.

In addition, an indication that the message was transmitted from the internal account may also be included in the message. For example, when the message is transmitted from the wireless device an indication that the message was send from a "Wireless" device may be appended to the sender's name (e.g., "Scott Kister (wireless)" scott.kister@danger.com), thereby identifying the true origin of the message while, at the same time, maintaining the original e-mail recipient address. In one embodiment, this indication may be enabled or disabled at the internal account 210, 410 by the end user.

Figure 6:
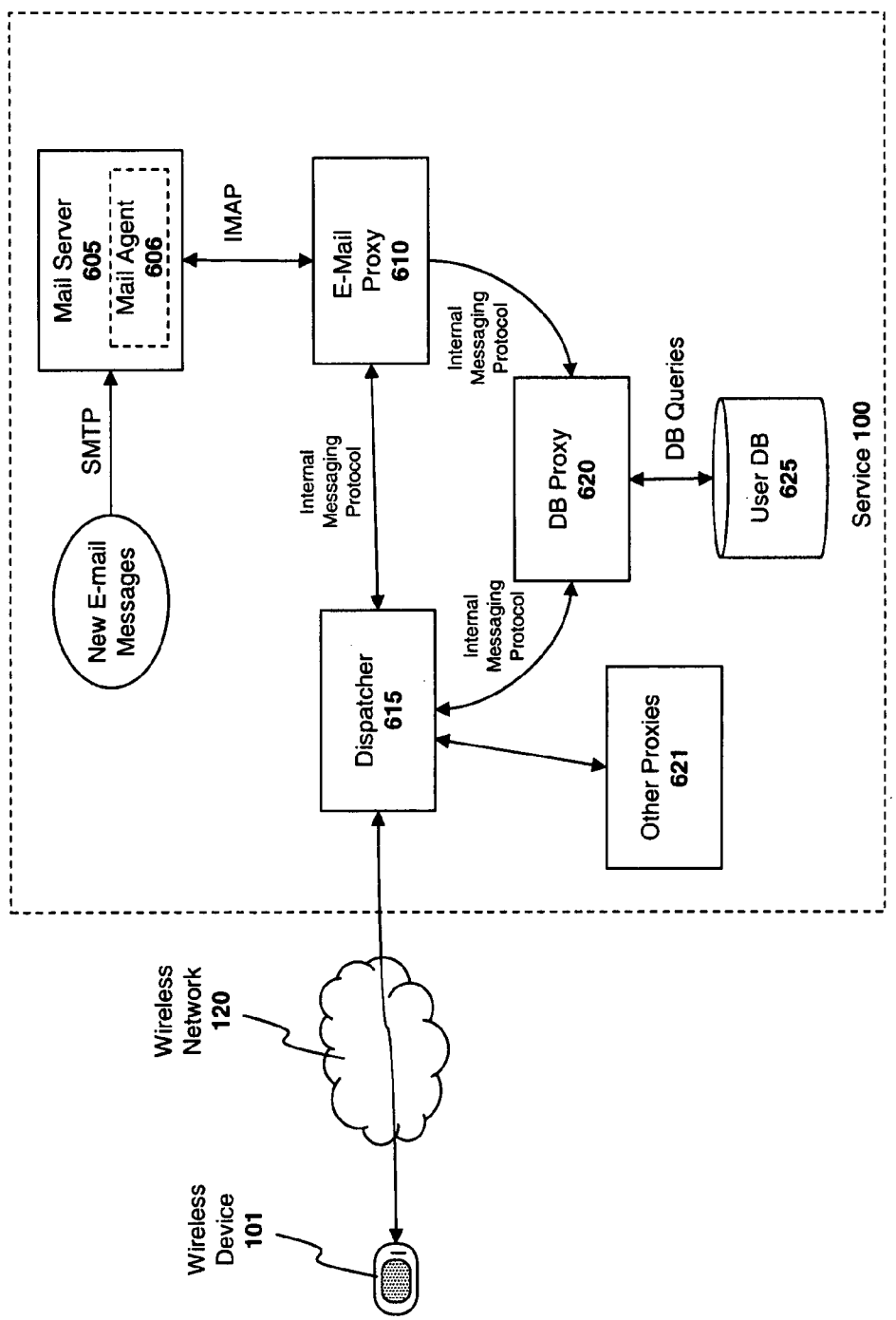
FIG. 6 illustrates one embodiment of an improved system for distributing electronic messages to a data processing device.

FIG. 6 illustrates another embodiment of an email system for distributing electronic messages to a wireless data processing device 101. This embodiment is comprised generally of a user database 625, a database proxy server 620 for accessing the user database 625, an e-mail proxy server 610, a dispatcher server 615 and a mail agent 606 executed on a mail server 605 (or, alternatively, on a separate server).

An exemplary portion of the user database 625 illustrated in FIG. 7 contains a mapping of user identification codes 701 to data processing device identification codes 702. The user ID/device ID mapping is used by the service 100 to identify the particular wireless device 101 to which e-mail messages and other data should be transmitted for a given user. In addition, the user database 625 contains the user's account name, the user's online status, including the particular dispatcher 615 through which the wireless device 101 is communicating, and the Subscriber Identity Module ("SIM") identification codes associated with the user (the user may maintain more than one SIM).

The dispatcher 615 forms the central point of communications for data transmitted between the wireless device 101 and the service 100. In one embodiment, the dispatcher 615 maintains socket connections (e.g., TCP sockets) between the wireless device 101 and the various proxy servers maintained on the service 100. For example, for an e-mail session, the dispatcher 615 opens and maintains a socket connection between the wireless device 101 and the e-mail proxy server 610. Similarly, for other wireless applications (e.g., instant messaging, Web browsing, . . . etc) the dispatcher 615 establishes and maintains socket connections between the wireless device 101 the appropriate proxy server 621 (e.g., an instant messaging proxy server, a Web proxy server, . . . etc). Each time a user logs in or out of the service 100, the dispatcher 615 notifies the DB proxy 620 to update the user's online status within the user database 625 accordingly. In addition, given the significant differences in bandwidth between the wireless network 120 and the local network on which the service 100 operates, the dispatcher 615 temporarily buffers data transmitted to and from the wireless device 101 over each individual socket connection.

The mail agent 606 executed on the mail server 605 (or on a separate server) continually tracks changes to the user's e-mail account. In one embodiment, the agent 606 periodically checks the user's inbox to determine whether the user has received any new e-mail messages. When a new e-mail message addressed to the user arrives, the mail agent 606 transmits a "new e-mail message" alert to the e-mail proxy server 610. The e-mail proxy server 610 forwards the new e-mail message alert to the DB proxy server 620. The e-mail proxy server may convert the format of the new e-mail message alert from a standard format (e.g., IMAP) to a proprietary messaging format employed by the service 100.

The DB proxy server 620 queries the user database 625 to determine whether the user is online or offline, and, if online, which dispatcher 615 the wireless data processing device 101 is connected through. The DB proxy server 620 then automatically transmits the new e-mail message alert to the user's wireless device 101 via the dispatcher 615. Thus, if the user is online, he/she receives an automatic indication when any new e-mail messages arrive at his/her e-mail account.

Figure 8:
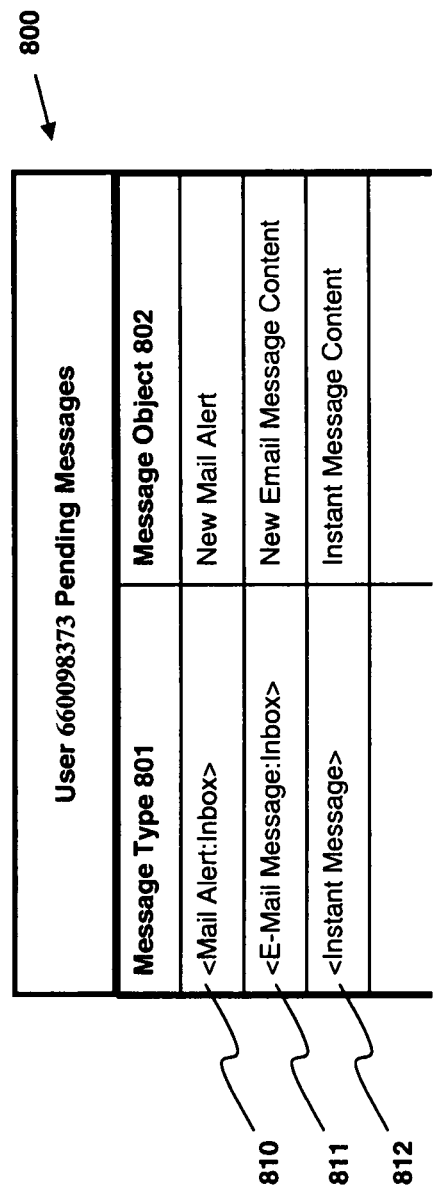
FIG. 8 illustrates a pending message table employed in one embodiment of the invention.

If, however, the user is offline, then the DB proxy 620 stores the new e-mail alert in a pending message table 800 such as that shown in FIG. 8. The pending message table is comprised of a message type indication 801, indicating the type of data stored in the table, and a message object 802 which contains the underlying message data. Three types of message types are illustrated in FIG. 8: a new e-mail message alert 801, a new e-mail message 811, and a new instant message 812. Of course, a virtually unlimited number of message types may be temporarily queued within on the user database 625 while still complying with the underlying principles of the invention.

In one embodiment, once a new e-mail message alert is stored in the user's pending message table 800 for a particular mail folder (e.g., the user's Inbox on a particular mail server), no additional alerts or e-mail messages are stored in the table for that mail folder, thereby conserving network bandwidth and storage space on the user database 625. If a new e-mail alert for a different folder is received, however, then the new e-mail alert is stored in the pending message table 800.

Whenever a user re-connects to the service 100 through a dispatcher 615, the dispatcher 615 initially checks the DB proxy 620 to determine whether any e-mail message alerts, e-mail messages or other types of data are pending for the wireless device 101. If so, then the dispatcher 615 retrieves them via the DB proxy 620 and transmits them to the wireless device 101.

In one embodiment, once the wireless device 101 receives the new e-mail message alert 810 (either immediately, or after it is queued in the user database), the wireless device 101 transmits a request for all new e-mail messages above a specified global ID value. The request may be generated automatically by the device 101 or manually, in response to a user command. As indicated in FIG. 5 new global ID's are assigned sequentially as new e-mail messages are received by the service 100. Accordingly, the wireless device 101 may query it's local e-mail storage to identify the maximum GID value for a previously-downloaded e-mail message, and then request all e-mail messages with GID values higher than the identified GID value. Transmitting a bulk request for all new e-mail messages in this manner saves a significant amount of network bandwidth when compared with the technique of requesting each new e-mail message individually.

The dispatcher 615 identifies the bulk request as an e-mail request (e.g., by reading the header of the data object associated with the request) and responsively forwards the request to the e-mail proxy 610. As mentioned above, if the request had been a Web page request or an instant messaging transaction, the dispatcher would forward the request to a Web proxy server or an instant messaging proxy server, respectively.

The e-mail proxy 610 decodes the request and responsively translates the request to the IMAP protocol (or other protocol employed by the mail server 605). For example, in response to the single request for "all new e-mail messages" the proxy server 610 may request each new e-mail message individually and then bundle them into a single, bulk e-mail message response to the data processing device 101, again conserving network bandwidth.

In one embodiment, the proxy server 610 initially requests a list of all new e-mail message headers as opposed to the entire contents of each e-mail message (i.e., e-mail header+ body). Once the message headers are received at the data processing device 101, the user may review the subject line of each message from the message header and download only those the e-mail messages which he/she wishes to read.

The wireless network 120 is not typically as reliable as a wired network. As such, the wireless device 101 may occasionally become disconnected from the wireless network 120 during the middle of a data transaction with the service 100. For example, the wireless device 101 may move out of contact with the wireless network after the e-mail proxy 610 has retrieved one or more e-mail messages from the e-mail server 605 on behalf of the user but before the requested e-mail messages have been successfully delivered to the wireless device 101 by the dispatcher 615. If this occurs, in one embodiment, the dispatcher 615 temporarily queues the e-mail messages (or other data) in memory until the wireless device 101 comes back online. Once the wireless device 101 reestablishes a connection with the dispatcher 615, the dispatcher 615 transmits the queued data to the wireless device 101.

In one embodiment, however, if the user has been out of contact for some predetermined period of time (e.g., 5 minutes), the dispatcher 615 transmits the queued data to the DB proxy 620, which then stores the data within a pending message table 800, as described above. Alternatively, or in addition, the dispatcher 615 may transmit the queued data to the DB proxy 620 after making a specified number of attempts to transmit the data to the wireless device 101 (i.e., rather than a specified amount of time).

When the user reestablishes a connection with the service 100, the dispatcher 615 (which may be a different dispatcher than the one that initially queued the data) queries the DB proxy 620 for any pending data. The DB proxy 620 then transmits the pending data to the dispatcher 615 which forwards the data to the wireless device 101.

Thus, the service 100 provides a reliable delivery system for e-mail messages and other data using multiple levels of queuing. The dispatcher 615 acts as a short-term queue, storing e-mail messages for a specified period of time. If the wireless device 101 is still offline after the specified period of time, the dispatcher 615 forwards the pending e-mail messages to a user database 625 maintained by the DB proxy 620, thereby freeing up memory and processing power which the dispatcher 615 can reallocate to other data processing device connections. The e-mail messages and other data are then stored in the user database 625 indefinitely (i.e., until the wireless device 101 comes back online).

Figure 9:
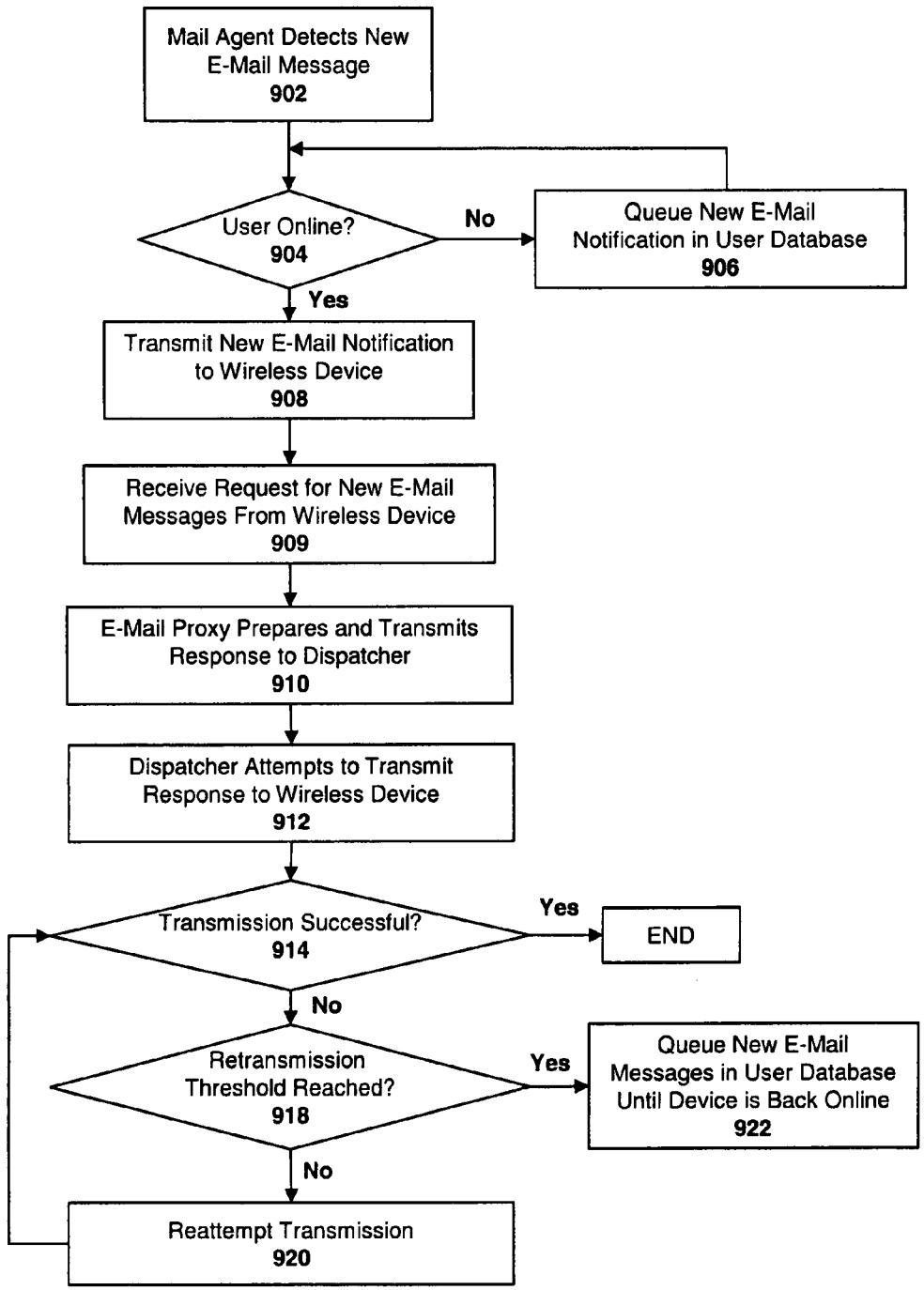
FIG. 9 illustrates a process according to one embodiment of the invention.

FIG. 9 is a flowchart which outlines various aspects of the e-mail delivery process just described. At 902 the mail agent 606 detects that new e-mail messages have arrived in the user's inbox on the mail server 605. At 904, the DB proxy 620 determines whether the wireless device 101 is currently online via a query to the user database 625. If not, the new e-mail notification is queued within the user database 906 and subsequently transmitted to the wireless device 101 the next time it connects to the service 100.

If the wireless device 101 is online, then at 908 the dispatcher transmits the new e-mail notification to the wireless device 101. At 909, the e-mail proxy 610 receives a request for all new e-mail messages from the wireless device 101 (e.g., above some specified GID value). At 910, the e-mail proxy retrieves, reformats and transmits the new e-mail messages (e.g., by bundling them in a single response) to the dispatcher and at 912 the dispatcher 615 attempts to transmit the e-mail messages to the wireless device.

If the transmission is successful, determined at 914, then the process ends. If, however, the transmission is unsuccessful, then the dispatcher 615 will continue to attempt to transmit the e-mail messages from it's local message queue, at 920, as long as a retransmission threshold condition has not been reached, determined at 918 (e.g., a time threshold or retransmission attempt threshold has not passed). If the retransmission threshold has been reached, then at 922, the e-mail messages are transmitted from the dispatcher queue to a long term pending message queue (e.g., the pending message table 800) within the user database 625.

New Embodiments of a System for Email Coordination and Synchronization

Figure 10:
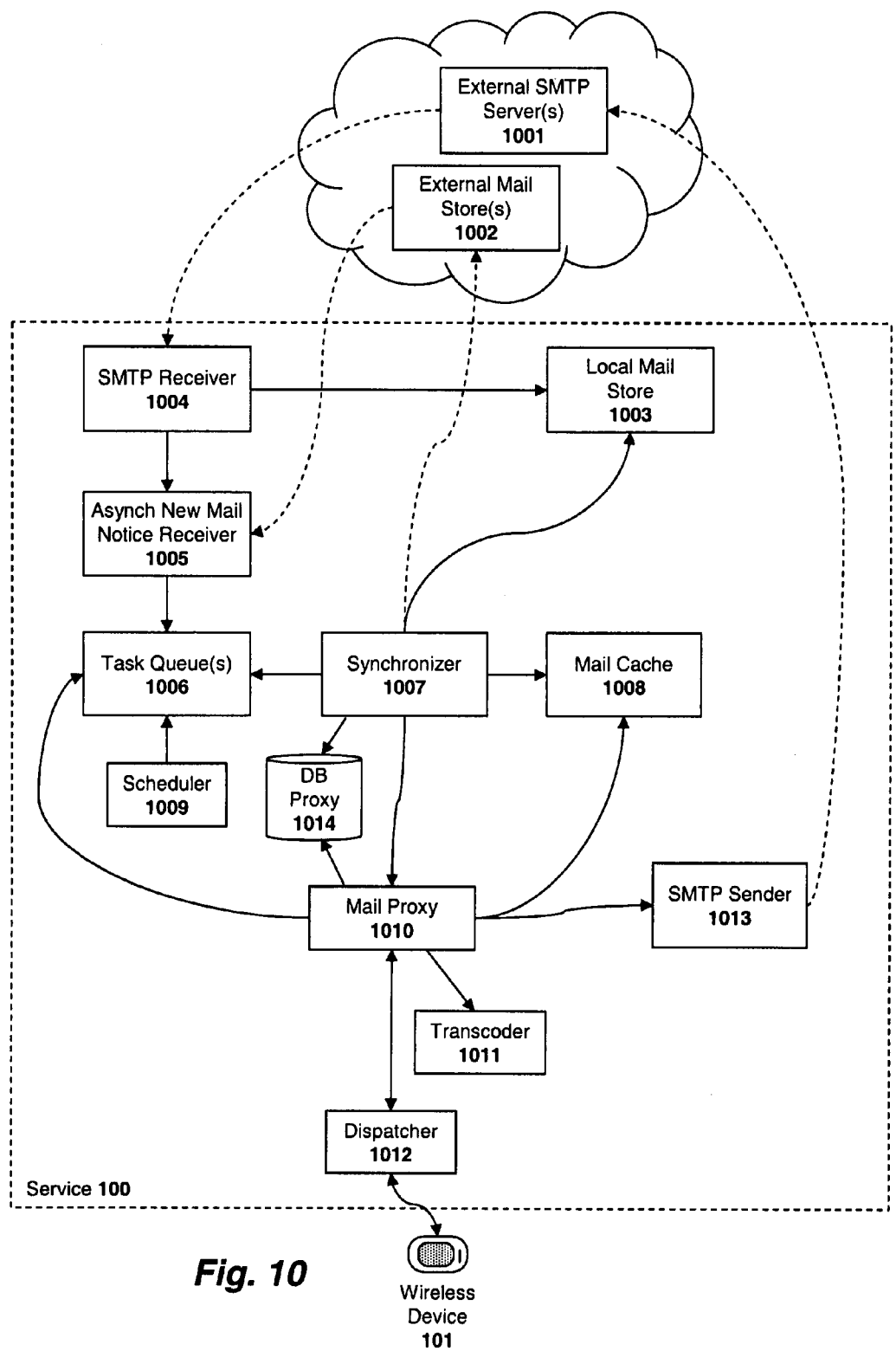
FIG. 10 illustrates a system architecture according to one embodiment of the invention.

FIG. 10 illustrates an architecture which employs additional techniques for managing email messages from internal and external email mail servers. In this embodiment, synchronization, distribution and scheduling of email messages is accomplished via several new components including an asynchronous new mail notice receiver 1005, a task queue 1006, a synchronizer 1007, a mail cache 1008 and a scheduler 1009. Unless otherwise stated, the components illustrated in FIG. 10 operate in the same or a similar manner as the corresponding components described above (e.g., the DB proxy 1014, the dispatcher 1012, the mail proxy 1010, etc).

In one embodiment of the invention, the task queue 1006 is a queue (or series of queues) where tasks are placed by other system components such as the asynchronous new mail notice receiver 1005, scheduler 1009, mail proxy 1010 and synchronizer 1007. The task queue 1006 is not strictly a linear queue; it is a relational database from which the next task to execute can be queried according to complex heuristics including, for example, the length of time an item has been in the queue, whether the task has a high or low priority, and whether it can be coalesced with other tasks. In a database implementation, a separate task may be stored in each row in the database. The task queue 1006 may also include one or more small server applications which perform atomic locking operations to prevent race conditions (e.g., which might occur if two entities attempt to complete the same task concurrently). Once tasks have been entered in the task queue, they are subsequently processed by other components such as the synchronizer 1007 (as described below).

Figure 11:
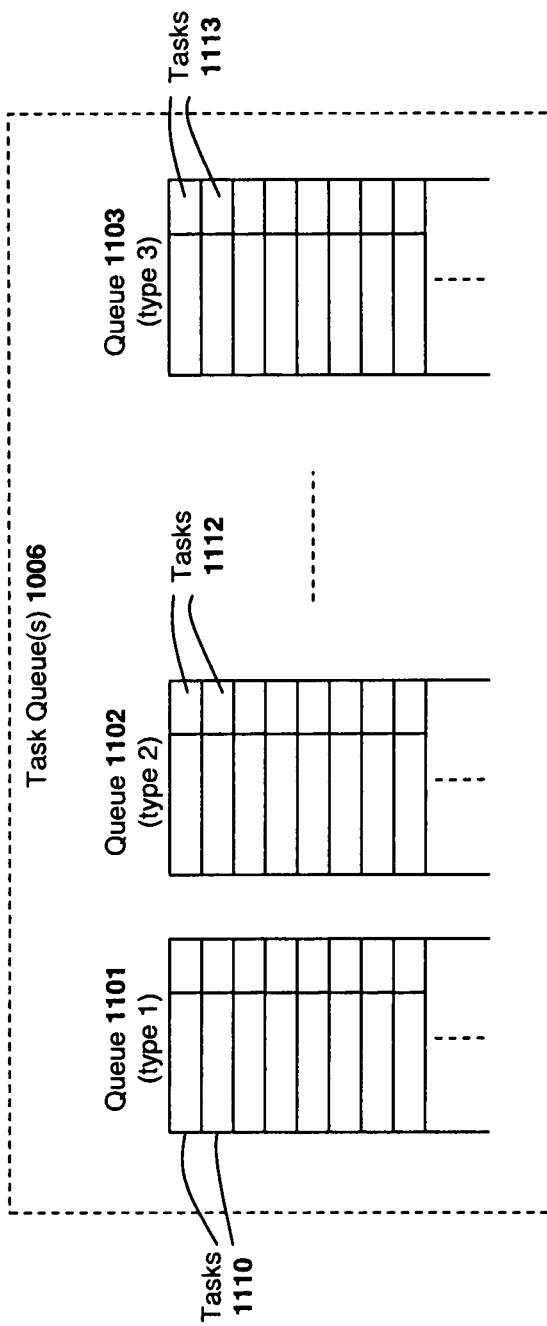
FIG. 11 illustrates a plurality of task queues according to one embodiment of the invention.

As illustrated in FIG. 11, the task queue 1006 may be comprised of multiple individual queues 1101-1103, with each queue containing tasks 1110-1113 of similar types and/or priorities. For example, each task queue 1101-1103 may represent a different priority level. In this embodiment, tasks in queues with relatively higher priority levels are generally serviced ahead of tasks with relatively lower priority levels, all other variables being equal (e.g., such as the length of time each task has been in the queue). Alternatively, or in addition, each task queue 1101-1103 may store different types of tasks. For example, new email notifications provided by the asynchronous new mail notice receiver 1005 may be placed in one queue, email operations scheduled by the scheduler 1009 may be placed in another queue, and message body requests generated by the synchronizer 1007 may be placed in a third queue.

Of course, the different task "types" may, in effect, represent different priorities to meet the different scheduling requirements of each task type. For example, user actions/requests generated by the mail proxy 1010 require fast turnaround and are therefore added to a "high-priority" queue. Synchronization tasks may be placed in a queue that permits random access so related items can be batched together. Other tasks, such as those generated by the scheduler 1009 may be placed in an ordinary medium-priority first-in-first out ("FIFO") queue. Various alternate and/or additional techniques for characterizing tasks and segregating the tasks into queues may be employed while still complying with the underlying principles of the invention.

One embodiment of the invention also includes a mail cache 1008 where message data is stored representing the last known state of the user's various mail accounts; data that has been transmitted to the device; data that has yet to be transmitted to the device; data that has yet to be transmitted to the various mail accounts; and transient local copies of message bodies which are cached for better performance. One or more relational databases may be employed within the mail cache 1008 for storing the message data.

FIG. 11 illustrates one embodiment of the mail cache 1008 which is logically subdivided into a persistent structure store 1204 and a message body cache 1205.

The persistent structure store 1204 mirrors the last-known state of each user's e-mail accounts (e.g., external accounts 1002 and internal accounts 1003). In one embodiment, the information stored within the persistent structure store 1204 includes all of a user's mail data except for message bodies (e.g., sender, subject, message recipients, message date, etc). The following is an outline of the schema for one embodiment of the persistent structure store:

1. A list of the email accounts associated with each user
2. For each account, an access method, a server address, authentication credentials, a last-synchronization time, a synchronization detail history, and a list of folders for which synchronization is performed
3. For each folder, a list of email messages
4. For each message, enough information to create a summary listing of that message including, but not limited to, date, subject, flags, sender and recipients.

In addition to the basic mail-data structure described above, the persistent structure store 1204 may also include virtual folders, message threads, and word indexes for full-text searches. In one embodiment, the persistent structure store 1204 maintains a distinction between the last known state of each message on the originating server (e.g., mail stores 1002, 1003) and the current local state, which may include the identity of pending, unsynchronized changes.

The following are examples of differences between the last-known-state-on-server and the current-local-state for a message:

1. A message is locally deleted, but the deletion is not yet synchronized;
2. A message is locally "hidden," which is a deletion that's not intended to get synchronized;
3. Flag changes not yet synchronized (e.g. an "unseen" designation changed to "seen");
4. A message is moved to a different folder and not yet synchronized.

In one embodiment, the persistent structure store also stores metadata about folders, not just messages; so it can also represent differences between last-known-state-on-server and current-local-state for folders. These may include folder renames and deletions.

In one embodiment, the information is maintained within the persistent structure store 1204 according to a cache management policy. In the simplest case, once the persistent structure store for a user has reached a specified threshold value, older information is removed to make room for new information. Alternatively, information which has not been accessed for the longest period of time may be removed to make room for new information and/or information which has been accessed more recently. Various other cache management policies may be implemented while still complying with the underlying principles of the invention.

Metadata stored within the persistent structure store 1204 reflecting each mail server's state is easy to regenerate (i.e., by querying the remote server), so it is considered transient. However, there is a significant optimization to be gained maintaining it in the mail cache since it is then possible to compare the mail server's new state with the last version stored in the mail cache and send only the differences to the data processing device. Without the mail server's prior state it would be necessary to send much more data to the data processing device, and the device will be responsible for figuring out what it already knows and what it doesn't.

With these concepts in mind, in one embodiment of the invention, multiple servers are implemented within the service to support multiple mail caches. When connected to the mail system a data processing device is "homed" on a particular mail cache server where the metadata for that user's mail account is stored. In addition, for performance, the mail data is not copied to shared storage (e.g., the user database). If a server storing the device's mail cache goes down (requiring the user to be re-homed), one embodiment of the invention accepts the performance hit of performing a cache-less synchronization iteration with the mail store.

In one embodiment of the invention, some metadata is local-only (i.e., only stored within the mail cache). This includes, for example, messages flagged as "hidden." In contrast to other mail data (which can always be retrieved from the mail store) this data needs to be reliably persistent. To accomplish this, two tiers of data are implemented within the persistent structure store—one which is reliably persistent (i.e., by storing it within shared storage or across multiple servers) and one which is not.

The message body cache 1205 holds complete message bodies which are cross-referenced with message metadata in the persistent structure store 1204. In one embodiment, message bodies are stored within the message body cache 1205 temporarily, according to a second cache management policy, which will typically be different from the cache management policy of the persistent structure store. Given the possibility of very-large third-party e-mail accounts, the cache management policy will not typically cache all of a user's e-mail data at any one time. Instead, an intelligent policy is implemented to remove messages based on variables such as the length of time the message has been in the cache, the last time the message was accessed, the overall level of activity within the user's account, and the amount of data already stored within the cache. For example, if a user accesses a particular message frequently (i.e., above a specified threshold value), then the message body cache 1205 may retain a copy of the message notwithstanding the fact that the message has been in the cache for a relatively long time. By contrast, if a message has been in the cache for a long time (e.g., a first specified period of time) and has not been recently accessed by the user (e.g., a second specified period of time), then the message body may be deleted from the message body cache. Various other cache management variables may be implemented to determine whether a message should be retained or removed.

In one embodiment, to optimize performance, the message body fetcher retrieves message bodies from mail servers in a speculative fashion (i.e., without explicit direction from the data processing device) whenever it detects new bodies available. In one embodiment, speculatively fetched bodies are not be transmitted to the device until requested by the device.

In one embodiment, a second layer of message caching is implemented on the data processing device 101. Specifically, in this embodiment, as soon as a new email message is received, metadata for that message is sent to the data processing device along with a "new message" notification. In one embodiment, the metadata is the same data that is stored within the persistent structure store 1204. Alternatively, the metadata may be a limited subset of the data stored within the persistent structure store 1204 (e.g., the message subject, sender, and recipients). Message bodies are transmitted to the data processing device only when requested by the end user.

In one embodiment, a different cache management policy is implemented on the data processing device to cache the metadata and/or message bodies (i.e., different from the cache management policy implemented on the system mail cache 1008). For example, once a message body has been downloaded to the device, there is no reason to retain the message body within the message body cache. Thus, in this embodiment, downloaded message bodies are automatically deleted from the message body cache. Once on the device, the message body is cached according to a separate cache management policy on the device. For example, on one embodiment, message bodies which have not been accessed for a predetermined period of time may be removed from the cache until requested by the end user.

In one embodiment, two criteria are used for managing the device-side cache: message size and how recent the message is. In one embodiment, very large messages (i.e., over a threshold value) are removed from the cache to reclaim the most memory with the smallest number of decached messages. This is subject to the limitation that very recent (i.e., received within a specified time period) very large messages should *not* be removed from the cache if possible.

In one embodiment, The synchronizer 1007 is a daemon (i.e., a software component which runs in a continuous loop) which continually updates the cache's view of the user's mail accounts 1002, 1003; updates the mail accounts with changes made by the user; and reconciles conflicts between the two. It also sends data asynchronously to the device 101 via the mail proxy 1010.

Figure 12:
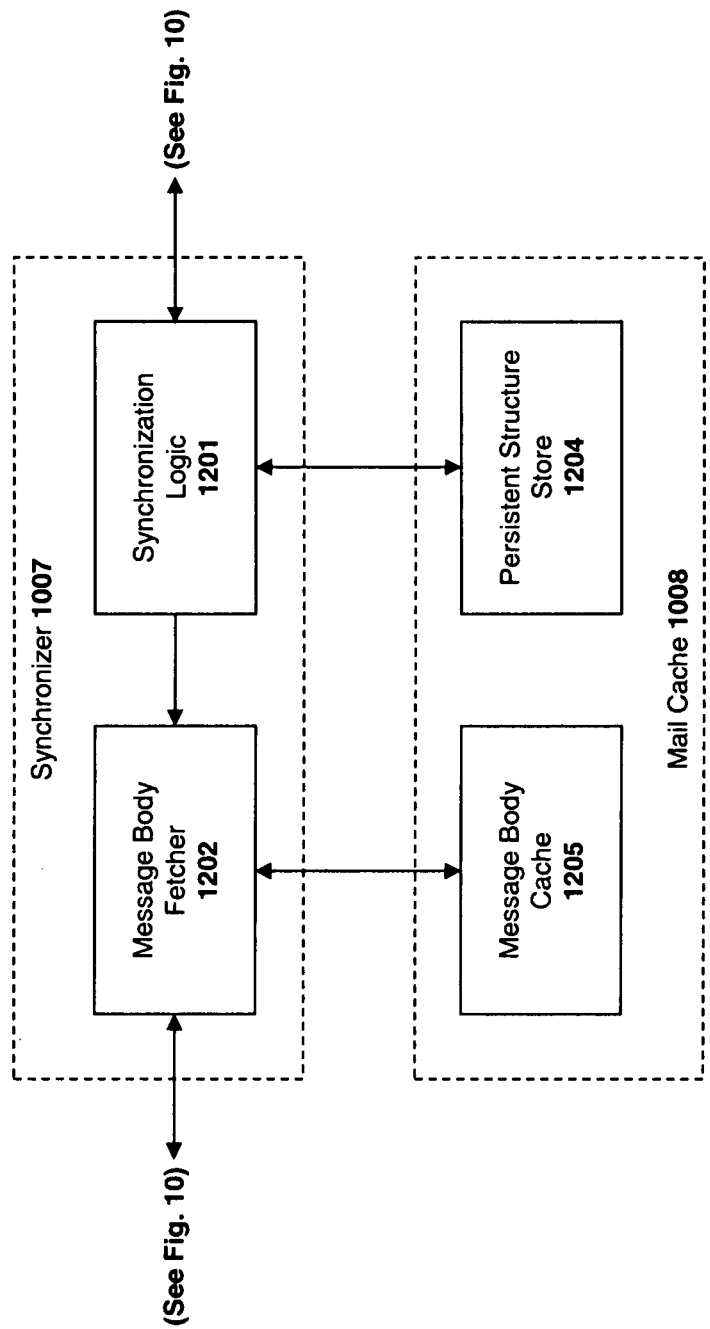
FIG. 12 illustrates a synchronizer and a mail cache employed in one embodiment of the invention.

As illustrated in FIG. 12, one embodiment of the synchronizer 1007 includes a message body fetcher component 1202 and synchronization logic 1201. As its name suggests, the message body fetcher 1202 is responsible for retrieving new message bodies and retrieving message bodies which have been removed from the cache upon request of the end user (e.g., bodies for messages which may still be in the persistent structure store 1204 but which have been flushed from the message body cache). The message body fetcher communicates with both external mail stores 1002 and internal mail stores 1003 to retrieve the requested message bodies.

The synchronization logic 1201 updates the mail cache's view of the user's mail accounts, updates the mail accounts with changes made by the user, and reconciles conflicts between the two. In other words, the synchronization logic 1201 is the component responsible for ensuring that the internal representation of a user's e-mail accounts matches the actual state on their authoritative servers, that this same state is also faithfully reflected on the wireless device 101, and that changes on either end are propagated appropriately. It also sends data asynchronously to the device via the mail proxy 1010. In one embodiment, to conserve bandwidth, the synchronization logic 1201 combines multiple mail operations when appropriate. For example, if a particular message has been read, modified, moved to a folder and then deleted by the end user, only the delete operation needs to be synchronized.

In operation, the synchronizer continually queries the task queue 1006 for accounts which need to be synchronized. Entries for user accounts are placed in the task queue in the following circumstances:

1. When the asynchronous new-mail notice receiver receives a new-mail notice for the account from an external mail store 1002 (through the SMTP receiver 1004);

2. When the user makes changes to message data on the wireless device 101 or via a Web-based interface that requires mirroring to the origin account;

3. When the scheduler 1009 determines that it is time to synchronize a user's account;

4. When a user action results in a cache miss requiring message data to be (re)downloaded. Note that this is a special case in that the user action will generally be pending in real time. Thus, for this operation, a "high-priority" task queue (e.g., queue 1101 in FIG. 11) may be used. In this case, the desired content is a parameter to the sync request, and the waiting client must receive a timely completion notice (i.e., the request to the service includes the identity of the message the user is waiting to read).

Figure 13:
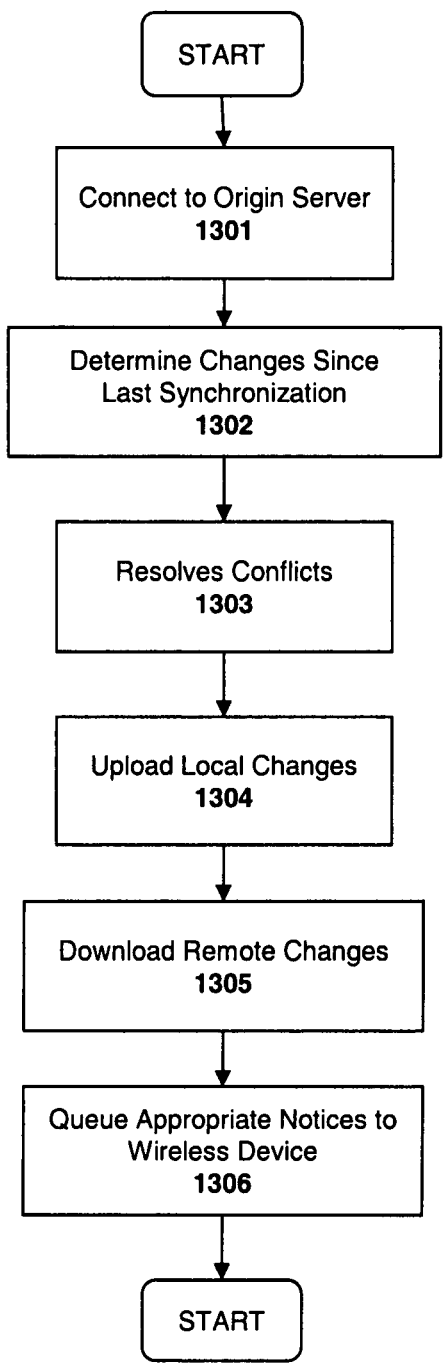
FIG. 13 illustrates a method implemented to synchronize accounts according to one embodiment of the invention.

In one embodiment, after identifying an account from the task queue 1006 on which to operate, the synchronizer performs the following actions, as indicated in FIG. 13:

1301. Connect to Origin Server

The synchronizer first connects to the account's origin server (e.g., external mail store 1002 or local mail store 1003). To do so, the synchronizer obtains the necessary account type/location information plus authentication credentials from the DB proxy 1014 and then uses this information to establish a connection with the account's origin server.

1302. Determine Changes Since the Last Synchronization

The synchronizer 1007 then determines what has changed in that account since the last synchronization. To do so, it fetches the list of remote folders and summary data for the messages they contain from the origin server. In one embodiment, a "quick scan" synchronization mode is employed in which only those message summaries that are newer than a given high-water mark are queried. This mode overlooks flag changes in older messages but will discover new messages. Once the data is collected from the origin server, it is compared with the representation of the account in the persistent structure store. Any differences found constitute the set of remote changes.

1303. Resolves Conflicts

The synchronizer then attempts to resolve any conflicts which may exist between the origin server's set of changes and the user's set of local changes. When the list of pending local changes to the user account's mail data is compared with the set of remote changes, if the same data item has changed in both places, a conflict exists and must be resolved (unless the change is identical on both ends). In one embodiment, the conflict detection and correction logic in the synchronizer will prefer the origin server's version over the local version on the principle that the server is authoritative. Alternatively, in one embodiment, the conflict detection and correction logic will choose the local version of the changes. In another embodiment, the synchronizer queries the user and allows the user to select the correct version of the changes.

1304. Upload Local Changes

Those local changes that have not been eliminated by conflict resolution are uploaded to the server via protocol sequences required by the external mail server 1002 (e.g., IMAP STORE commands, POP DELE commands, etc).

1305. Download Remote Changes

Any relevant structure data not already obtained through the previous steps is downloaded, along with the bodies of any new messages discovered. The results are placed in the persistent structure store 1204 and the message body cache 1205. In one embodiment, newly added message bodies remain in the cache for a certain minimum amount of time to permit the device to respond to its asynchronous mail-change notices and request the bodies.

1306. Queue Appropriate Notices

Once the remote changes have been downloaded, appropriate notices (e.g., new mail notices, message deletion notices, etc.) are queued for asynchronous delivery to the device via the mail proxy 1010 and dispatcher 1012 (as described above). In one embodiment, new information in the persistent structure store resulting from remote changes automatically causes the delivery of asynchronous notices to the device, which in turn may request additional data. In the case of simple changes such as flags switching on and off, the data itself may be contained in the notice.

In one embodiment, the scheduler 1009 is a daemon which directs the synchronizer in which accounts to operate on and when, by placing tasks for user accounts in the task queue 1006. The scheduler 1009 may employ different sync-frequency heuristics for each account, based on variables such as account activity and user preferences. For example, if a user is actively working on his/her account (e.g., actively sending and reading email messages) then the scheduler 1009 may temporarily increase the frequency of synchronization. Similarly, if a user's external mail account 1002 is very active, then the scheduler 1009 may increase the frequency of synchronization (relative to accounts with less activity). In one embodiment, the scheduler 1009 checks the DB proxy 1014 to determine account activity. If the DB proxy 1014 indicates that the user's account is "active" (e.g., because new messages exist) then the scheduler 1009 increases the frequency of synchronization. By contrast, if the DB proxy 1014 indicates that the user's account is "inactive" (e.g., because the user is offline and/or no new messages exist) then the scheduler 1009 decreases the frequency of synchronization. Similarly, if a transient error occurred during the last synchronization (e.g., due to an expired or incorrect password or other authentication data), then the scheduler 1009 may decrease the frequency of synchronization by a larger amount, or may disable scheduled synchronization until the error is fixed (e.g., until the correct user name and password is provided to the system). In general, the heuristics employed by the scheduler include, but are not limited to, the following variables: the time of last synchronization; the frequency of errors when syncing; the volume of mail seen in this account; external email provider requirements/preferences; and the volume of pending changes to be synchronized back.

As described above, in one embodiment, the mail proxy 1010 performs a queuing function for the wireless device 101 and communicates to the device through the dispatcher 1012. For example, in response to a synchronization by the synchronizer 1007 and/or a new mail notification received by the asynchronous new mail notice receiver 1005, the mail proxy 1010 pushes a new message notification to the wireless device 101. In one embodiment, the new message notification includes the metadata for each message (e.g., the same or a subset of the information stored within the persistent structure store 1204 such as the sender ID, the subject, the date and time, etc). Using the metadata, the user may then request full message bodies from the message body cache 1205.

In one embodiment, the SMTP receiver 1004 processes inbound SMTP requests (e.g., email account updates such as new messages) from external SMTP servers 1001. It may also perform spam filtering and attachment-stripping prior to placing the new messages in the local mail store 1003. Once an inbound message is placed in the local mail store 1003, the asynchronous new-mail notice receiver 1005 is alerted to the arrival of the new message.

In one embodiment, the local mail store 1003 is where messages belonging to internal user accounts are stored, as well as external messages received from external SMTP servers 1001. It may be an IMAP server just like the external mail accounts 1002, in which case the only difference between the local mail store 1003 and external accounts 1002 (from the perspective of the other system components such as the synchronizer 1007 and mail cache 1008) is that the local mail store 1003 is hosted by the service 100.

As mentioned above, the asynchronous new-mail notice receiver 1005 handles asynchronous notifications related to the arrival of new mail in a user's various email accounts (e.g., external account 1002 and local mail account 1003). Certain external accounts 1002 may push new mail notifications to the asynchronous new-mail notice receiver 1004, thereby alleviating the need to continually poll the external accounts for changes.

Figure 14:
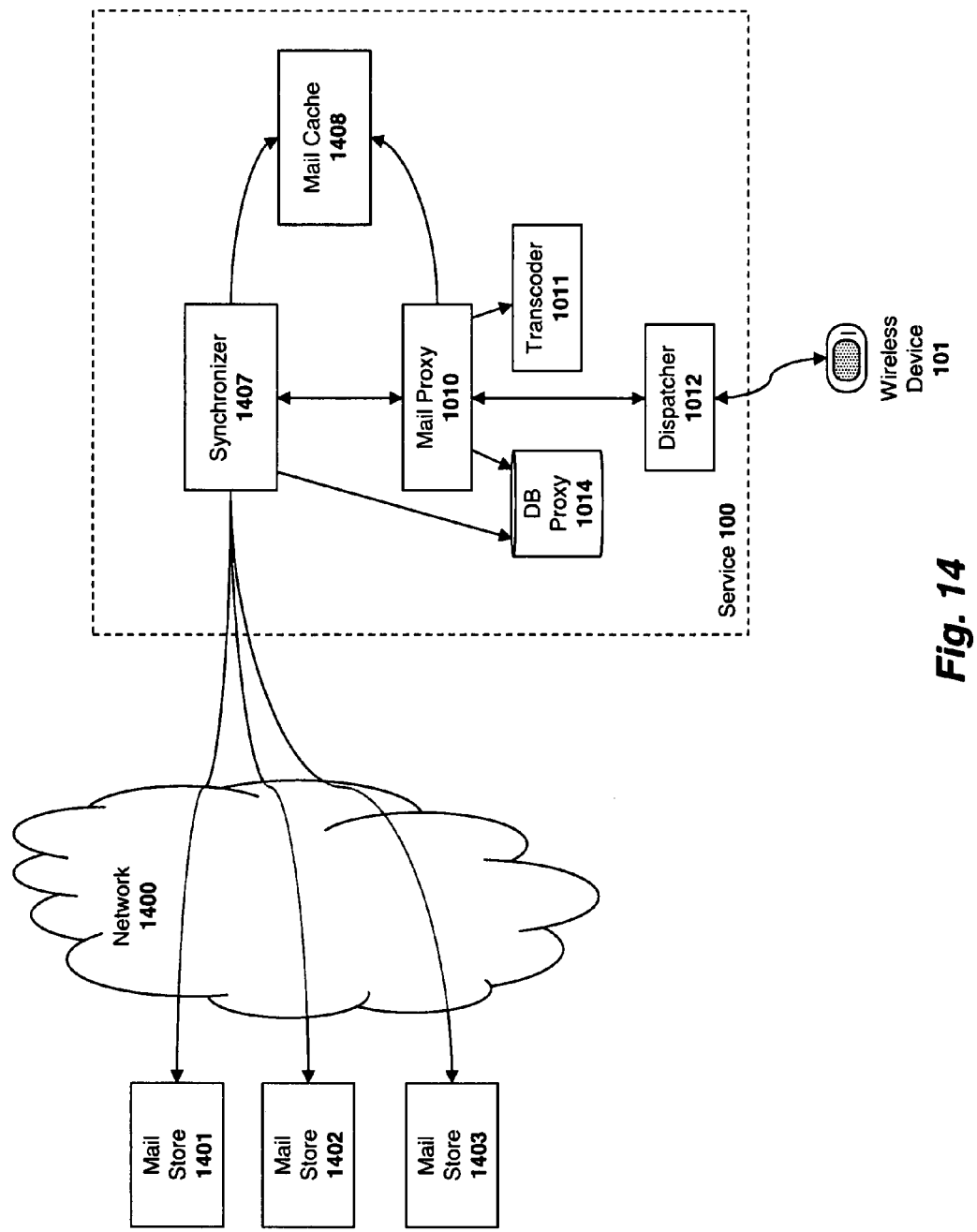
FIG. 14 illustrates another embodiment of a system for synchronizing email messages between remote mail stores, a local mail store and a data processing device.

FIG. 14 illustrates another embodiment of a system for synchronizing email between one or more email stores 1401-1403 and a wireless data processing device 101 using a synchronizer module 1407 and a mail cache 1408. Notably, this embodiment does not include a scheduler or a task queue as do the embodiments described above. Synchronization is performed based on device-driven events such as modifications to the state of mail data on the data processing device 101.

Figure 15:
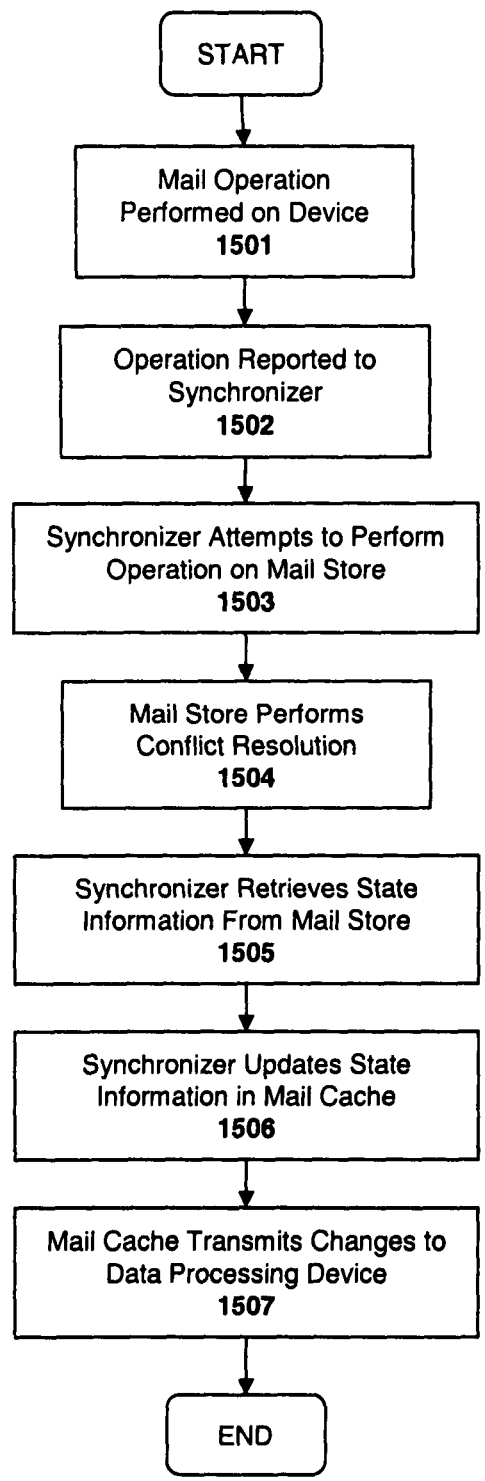
FIG. 15 illustrates another embodiment of a method for synchronizing email messages between remote mail stores, a local mail store and a data processing device.

One embodiment of a method implemented by the service shown in FIG. 14 to synchronize with mail stores is illustrated in FIG. 15. At 1501, a mail operation is performed by a user on the data processing device. For example, the user may delete one or more email messages.

At 1502, the operation and the identity of the email message(s) are reported to the synchronizer module 1407 (via the mail proxy 1010). At 1503, the synchronizer 1407 attempts to perform the operation on one of the mail stores 1401-1403 (i.e., the one containing the email message on which the operation was performed). At 1504, the mail store performs conflict resolution on the operation if needed. If the operation requested by the synchronizer conflicts with a previous operation, then the mail server may reject the request by the synchronizer. By way of example, if a user connected to a mail store through a desktop interface (e.g., a Web browser) and moved an email message to a new folder before deleting the same email message from the data processing device, the delete attempt would fail. Various other known conflict resolution techniques may be implemented on the mail store.

At 1505, the synchronizer 1407 retrieves updated state information from the mail store on which the operation was requested. Returning to the above example, if the delete operation failed because the email message was moved to a new folder, this information would be sent to the synchronizer 1407.

At 1506, the synchronizer 1407 updates the state information within the mail cache 1408. In one embodiment, the mail cache 1408 employs the same architecture as the mail cache 1008 described above. For example, the mail cache includes a persistent structure store 1204 for storing metadata related to the state of each user's mail store and a message body cache 1205 for caching message bodies. Thus, the updated state information is reflected in the persistent structure store 1204 and/or the message body cache 1205.

At 1507, the mail cache 1408 transmits the updated changes to the wireless data processing device 101.

In one embodiment, multiple synchronizers and mail caches such as those described above are implemented across multiple physical servers. When a user is connected to the service, the user's mail cache is maintained on a particular server—i.e., the user is "homed" on a particular mail cache server and/or synchronizer within the service. When the service wants to connect to a particular mail store on behalf of the user, it first checks to determine whether the user is homed on a particular mail server cache and synchronizer. This information may be maintained within the user database. If so, the mail request is directed there, where a live connection to the remote mail server may already be established and can be reused.

A large amount of state information concerning the user's remote-mail-server session is maintained locally in the mail cache where that user/account is homed. The data is local for the sake of server and network performance. To facilitate re-homing of that user/account to a different node (e.g., if a server goes down, or in case it's desirable to rebalance the load across a different set of servers), one embodiment of the invention moves the local state to shared storage such as the user database (i.e., via the DB proxy).

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. Additionally, machine-executable instructions may be downloaded as a computer program which may be transferred from a remote computer (e.g., a server) to a requesting computer (e.g., a client) via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, the functional modules illustrated in FIG. 10 may each be implemented as separate physical server machines or may be distributed across multiple physical machines. Moreover certain modules may be grouped together on a single machine. In addition, while embodiments of the invention are described above in the context of IMAP and POP, the underlying principles of the invention are not limited to any particular type of protocol. Accordingly, the scope and spirit of the invention should be judged in terms of the claims which follow.

What is claimed is:

1. A computer-implemented system, comprising:
    at least a memory and a processor configured to implement an email service to synchronize email messages between an external email server, a local email server, and a remote wireless data processing device;
    a task queue comprised of individual queues, one or more of the individual queues containing task entries and representing a different priority level than at least one other of the individual queues, each task entry associated with a user email account on the external email server and/or on the local email server and representing a task to be performed in relation to the user email account;
    a mail cache configured to maintain a distinction between a last known state of an email message stored on the external email server and/or the local email server, and a current local state of the email message stored on the remote wireless data processing device, the mail cache including:
        a message body cache configured to store at least a message body of the email message; and
        a cache management policy configured to determine whether to remove the message body from the message body cache based on a frequency that the email message is accessed; and
    a synchronizer configured to:
        read synchronization tasks that are associated with the email message from the task queue, the synchronization tasks including a first synchronization task associated with a first change to the email message based on a first user input and a second synchronization task associated with a second change to the email message based on a second user input occurring subsequent to the first change, the second synchronization task configured to supersede the first synchronization task;
        execute the second synchronization task related to the email message based on the second user input, without executing the first synchronization task related to the message based on the first user input, to synchronize the email message stored on the external email server, the local email server, and the remote wireless data processing device.

2. The system as in claim 1 wherein, to synchronize the email message, the synchronizer is further configured to:
    connect to the external email server using authentication data for the user email account;
    identify synchronization conflicts between the external email server and the local email server for the email message;
    upload the changes to the email message at the local email server to the external email server;
    download the changes to the email message at the external email server to the local email server; and
    transmit a notification of the changes to the email message to the remote wireless data processing device.

3. The system as in claim 1 further comprising a scheduler configured to add new synchronization tasks to the one or more individual queues of the task queue according to a synchronization schedule.

4. The system as in claim 3 wherein the scheduler is further configured to adjust the synchronization schedule based on activity in the user email account.

5. The system as in claim 4 wherein the scheduler is further configured to:
    increase a frequency of synchronization if the user email account is active; and
    decrease the frequency of synchronization if the user email account is inactive.

6. The system as in claim 1 further comprising an asynchronous new mail notice receiver configured to add new synchronization tasks to the one or more individual queues of the task queue in response to receipt of one or more new email messages in the user email account.

7. The system as in claim 1 further comprising an email data cache comprising:
    a persistent structure store for storing metadata associated with the email message.

8. A method for synchronizing email messages between an external email server, a local email server, and a remote wireless data processing device, the method comprising:
    storing task entries within a task queue, each task entry associated with a user email account on the external email server and/or on the local email server and representing a task to be performed in relation to the user email account, the task queue including individual queues, one or more of the individual queues representing a different type of task than at least one other of the individual queues, the task entries including a first task entry associated with a first change to an email message based on a first user input and a second task entry associated with a second change to the email message based on a second user input occurring subsequent to the first change;

storing message bodies of email messages in a cache;

determining whether to remove one or more of the message bodies from the cache based on a frequency that a corresponding email message is accessed;

reading a task entry from one of the individual queues of the task queue, the task entry containing an indication of the user email account to synchronize;

connecting to the external email server using authentication data for the user email account;

uploading the second change to the email message based on the second user input at the local email server to the external email server without uploading the first change to the email message based on the first user input, the second change to the email message superseding the first change to the email message;

downloading the change to the email message at the external email server to the local email server; and transmitting a notification of the change to the email message to the remote wireless data processing device.

9. The method as in claim 8 further comprising adding new synchronization tasks to the one or more individual queues of the task queue according to a synchronization schedule.

10. The method as in claim 9 further comprising adjusting the synchronization schedule based on activity in the user email account.

11. The method as in claim 10 further comprising:
increasing a frequency of synchronization if the user email account is active; and
decreasing the frequency of synchronization if the user email account is inactive.

12. The method as in claim 8 further comprising adding new synchronization tasks to the one or more individual queues of the task queue in response to receipt of one or more new email messages in the user email account.

13. The method as in claim 8 further comprising:
storing metadata associated with the email message in an additional cache; and
storing at least a message body of the email message in the mail cache.

14. One or more computer-readable storage media devices having program code stored thereon which, when executed by a computer, causes the computer to perform:
storing task entries within a task queue each entry associated with a user email account on an external email server and/or on a local email server and representing a task to be performed in relation to the user email account, the task queue including individual queues, one or more of the individual queues representing a different priority level or a different type of task than at least one other of the individual queues, the task entries including a first task entry associated with a first change to an email message based on a first user input and a second task entry associated with a second change to the email message based on a second user input occurring subsequent to the first change;

storing message bodies of email messages in a cache;

determining whether to remove one or more of the message bodies from the cache based on a frequency that a corresponding email message is accessed, the one or more of the message bodies being removable based on the frequency being below a predefined threshold;

reading a task entry from one of the individual queues of the task queue, the task entry containing an indication of the user email account to synchronize;

connecting to the external email server using authentication data for the user email account;

determining changes on the external email server since a last synchronization by at least employing a quick scan synchronization mode which is configured to query message summaries that are newer than the last synchronization, the message summaries being associated with one or more email messages stored at the external email server;

identifying synchronization conflicts between the external email server and the local email server for the email message;

uploading the second change to the email message based on the second user input at the local email server to the external email server without uploading the first change to the email message based on the first user input, the second change to the email message superseding the first change to the email message;

downloading the change to the email message at the external email server to the local email server; and transmitting a notification of the change to the email message to the remote wireless data processing device that is in communication with the local email server and/or the external email server.

15. The one or more computer-readable storage media devices as in claim 14, wherein the program code, when executed, further causes the computer to perform adding new synchronization tasks to the one or more individual queues of the task queue according to a synchronization schedule.

16. The one or more computer-readable storage media devices as in claim 15, wherein the program code, when executed, further causes the computer to perform adjusting the synchronization schedule based on activity in the user email account.

17. The one or more computer-readable storage media devices as in claim 16, wherein the program code, when executed, further causes the computer to perform:
increasing a frequency of synchronization if the user email account is active; and
decreasing the frequency of synchronization if the user email account is inactive.

18. The one or more computer-readable storage media devices as in claim 14, wherein the program code, when executed, further causes the computer to perform adding new synchronization tasks to the one or more individual queues in the task queue in response to receipt of one or more new email messages in the user email account.

19. The one or more computer-readable storage media devices as in claim 14, wherein the program code, when executed, further causes the computer to perform:
storing metadata associated with the email message in an additional cache; and
storing at least a message body of the email message in the mail cache.

20. The one or more computer-readable storage media devices as in claim 14, wherein the program code, when executed, further causes the computer to perform implementing a cache management policy to delete a message body of the email message from a mail cache at the local email server responsive to the message body being downloaded to a remote wireless data processing device that communicates with the local email server and/or the external email server.

\* \* \* \* \*